United States Patent Office 3,441,203
Patented Apr. 29, 1969

3,441,203
MOTOR-COMPRESSOR FOR AN ENCAPSULATED
REFRIGERATING UNIT
Bendt W. Larsen, Augustenborg, and Knud V. Valbjorn, Nordborg, Denmark, assignors to Danfoss A/S, Nordborg, Denmark, a company of Denmark
Filed Feb. 28, 1967, Ser. No. 619,278
Claims priority, application Germany, Mar. 1, 1966, D 49,467
Int. Cl. F04b 39/00
U.S. Cl. 230—235       10 Claims

ABSTRACT OF THE DISCLOSURE

A hermetically sealed refrigerant compressor provided with a strap mount or support mounting a motor-compressor assembly and its suspension system free of direct fixed connection to the capsule within which the entire assembly is hermetically sealed. The strap mount provides for assembly of the entire assembly externally of the capsule and is received completely assembled in the capsule and held by the capsule and guide bars fixed thereon in position within the capsule upon assembly of the capsule about the strap mount and entire inner motor-compressor assembly.

---

This invention relates generally to refrigeration and air conditioning compressors and more particularly to mounts and suspension assemblies for hermetically sealed compressors and a method of assembly thereof.

Hermetically sealed refrigerant compressors generally comprise a motor-compressor unit in a hermetic capsule. These known constructions have a suspension system that resiliently mounts the motor-compressor unit within the capsule. The suspension system, in the known compressors, is relatively hard to assemble since the motor-compressor unit has to be introduced into the capsule before the springs of the suspension system can be attached to the outer capsule or casing and to the motor-compressor. Moreover, the suspension system must be made such that the springs are adjacent the joint along which the capsule halves or parts are eventually hermetically joined. This is necessary in order to readily permit manipulation of the springs for assembly. As a result of these requirements the manner in which the capsule or casing is subdivided in part depends upon the way the springs are suspended or the springs in turn must be suspended depending upon the way the case is subdivided. These requirements limit the manner in which the hermetic capsule or casing and suspension system may be constructed although a different construction might be preferable for operational and other reasons.

It is a principal object of the present invention to provide a new, improved and simplified method of assembly and mounting of a motor-compressor and its suspension system in a hermetic capsule.

Another object of the invention is to provide an improved hermetic compressor construction in which the position of the springs of the suspension system for the motor-compressor within a hermetic capsule can be located in optimum positions independently of the capsule construction in the area of jointure of its component parts.

A feature of the invention is the provision of a closed strap mount or support circumferentially enclosing a motor-compressor and its suspension system. The suspension system is assembled with the motor-compressor and strap support externally of the casing or capsule. As a consequence the strap mount protects the compressor assembly from damage during insertion into the hermetic capsule and all points of suspension are readily accessible and the springs of the suspension system may be arranged in desired optimum positions irrespective of the separation joint of the capsule halves. The entire inner assembly, including the support structure, the motor-compressor and suspension system therefore mounted within the support structure, is then introduced into the casing and the casing or capsule enclosing the entire assembly holds it in position within itself.

Another feature is the provision of guide bar means which releasably receive the strap support or mount with the entire compressor assembly therein. The guide bar structure is secured to one of the halves of the capsule and is resiliently constructed so that as it bears against the strap mount upon closure of the capsule about the inner assembly so that additional resilient damping is provided as well as outwardly directed forces against the inner surfaces of a capsule that hold the strap support or mount in position with the compressor assembly therein.

Simple means are provided on the strap sections between the capsule and the strap mount providing points of contact or line contact that are kept spaced short distances on the strap mount for the natural resonance frequency of the assembly to remain sufficiently high to avoid resonating to most frequencies. These points of contact are defined by plugs of synthetic material which improve the silencing effect and substantially avoid transmission of noise externally of the capsule and keep the strap mount from slippage or movement relative to the capsule.

The strap support provides for affixing of compression springs of the suspension system to a common support structure at points substantially within a common plane defined by the strap mount which is in a horizontal plane making an angle with a plane at a diagonal jointure of the capsule halves and substantially normal to a vertical shaft of the motor-compressor unit. The springs are conical springs having progressive resistance characteristics and have their longitudinal axis in planes corresponding to diagonals of a polygonal, preferably substantially a rectangle, configuration or cross section of the strap support and intersecting at a point substantially corresponding to the center of gravity and at the shaft of the motor-compressor unit.

Other features and advantages of the refrigerant compressor and mount in accordance with the present invention will be better understood as described in the following specification and appended claims in conjunction with the following drawings in which:

Figure 1:
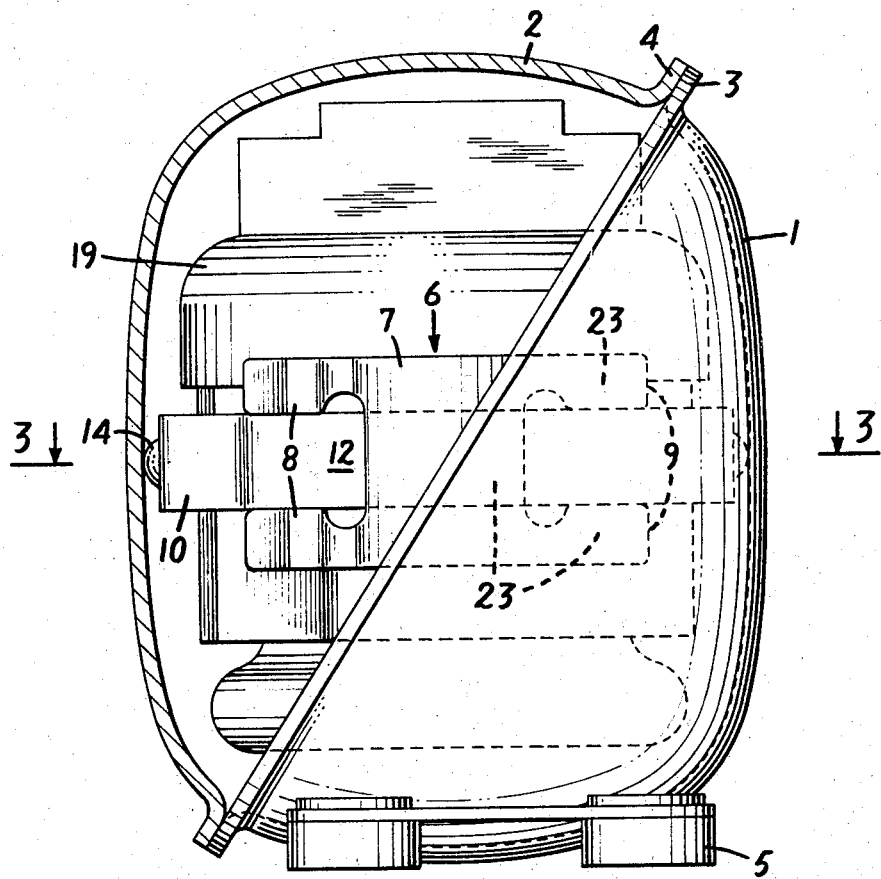
FIG. 1, is a side elevation view, partly in section, of a hermetically sealed compressor provided with a strap mount in accordance with the invention.
Figure 2:
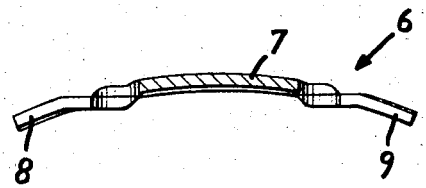
FIG. 2, is a fragmentary section view taken along section line 2—2 of FIG. 1.
Figure 3:
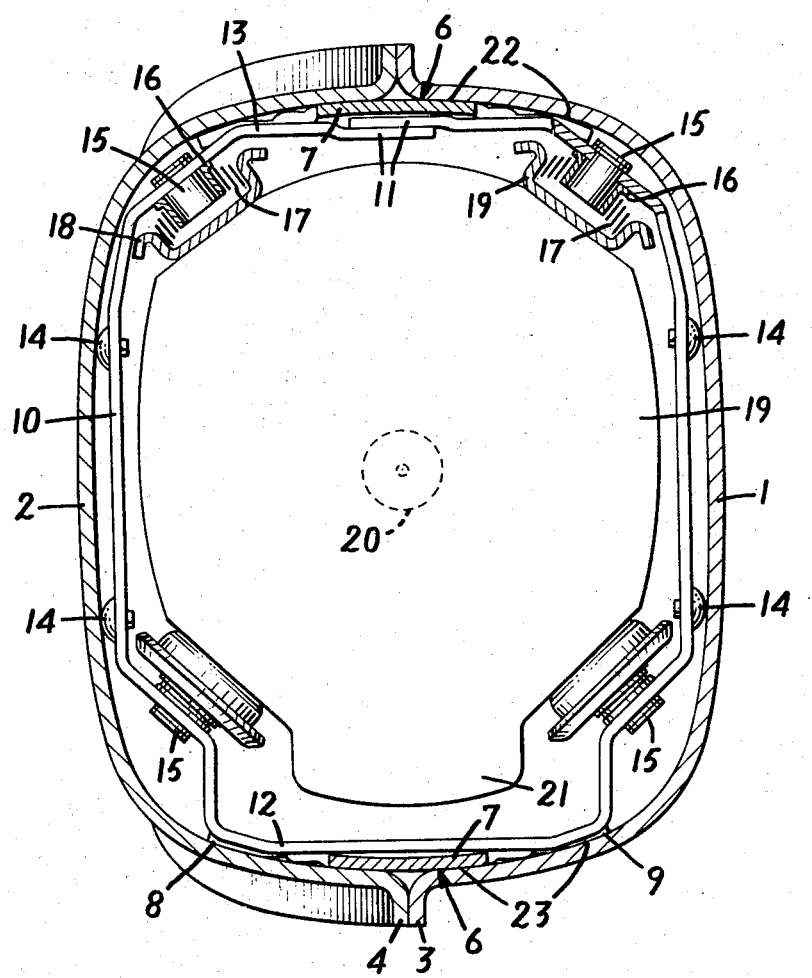
FIG. 3, is a section view taken along section line 3—3 of FIG. 1 and is a view of an assembled strap support or mount construction and a motor-compressor having a suspension system partly in section and illustrates an entire compressor assembly according to the invention upon insertion into a hermetic capsule.

As illustrated in the drawing a hermetic capsule comprises two equal metallic halves consisting of a lower half 1 and an upper half 2 provided with flanges 3, 4 joined in a diagonal plane of jointure at which the two halves are hermetically sealed, for example by welding. The lower half 1 of the capsule or casing is provided with feet 5 on which the capsule rests and is disposed in a vertical position for operation in the manner illustrated in FIG. 1.

The flanges 3–4 are joined along a diagonal plane in order to provide a maximum opening in each of the halves for receiving, during assembly, as readily as possible a motor-compressor therein as hereinafter explained.

The lower half or part 1 of the capsule is provided with a guide bar assembly 6 on either side comprising two guide bars which are welded to the inner surfaces of the case at 7. The weld spots are illustrated at 22 and 23. Each of the bars has bent fork-like ends 8, 9 for receiving thereagainst a closed strap support or mount 10 for a motor-compressor unit and its suspension system as hereinafter described.

The strap mount or support 10 comprises a resilient strap of material, for example metal, assembled in a closed substantially polygonal configuration and having ends 11 welded or otherwise joined, for example by rivets. The strap mount 10 has two parallel sides 12, 13 which slide between the bent fork-like ends 8, 9 of the guide bar assembly 6. The strap support 10 is provided with four synthetic plugs 14, made of a synthetic material and are spaced circumferentially of the strap support to define point contact areas against the inner wall of the casing or capsule 1, 2 when the strap mount 10 is received within the casing as hereinafter explained. The strap mount sections between the contact points are sufficiently short that the natural resonant frequency of the assembly remains sufficiently high that it will not resonate to most frequencies.

Within the strap support 10 is received a suspension system for suspending a motor-compressor from the mount 10. Four pins 15 of non-cylindrical cross section are attached to the strap mount 10 for non-rotatably supporting sockets 16 on each of the pins. These sockets receive conical, coiled compression springs 17 which may be constructed to have progressive resistance and resilience therein. Inner convolutions of each spring are received in a respective cup 18 each of which is attached to a refrigerant motor-compressor unit 19 having a vertical drive shaft 20.

The construction heretofore described provides for easy assembly of the motor-compressor within the strap support or mount 10 while still externally of the capsule 1, 2. The motor-compressor 19 is first placed inside the strap support 10 with the cups 18 thereon fixed in position then the springs are housed in the cups with their sockets 16 in position axially thereof and the pins 15 are pressed in position extending axially of the spring sockets. The strap 10 may be joined at the ends thereof after assembly of the suspension system in order to provide sufficient clearance for the insertion of the springs and sockets held by pins 15. Since the entire assembly internally of the strap 10 in conjunction with the strap 10 is assembled externally of the casing or capsule halves 1, 2 making access very easy and is then inserted into position in the lower half 1 with the support 10 providing a guard during assembly and insertion in the capsule. The upper half 2 of the capsule is then superimposed over the bottom half 1 and the capsule hermetically sealed by welding or otherwise hermetically joining the two halves along the capsule flanges 3, 4.

As can be seen from the drawing the jointure of the two halves 1, 2 is effected along a plane substantially diagonal to the capsule which is substantially cubic-shaped. The strap 10 is substantially horizontal while the area of contact with the casing at the guide bar ends 7, 8 is carried out through a resilient connection arrangement along the lower casing due to the resiliency of the strap support. The plugs 14 bear against the outer casing (FIG. 1) making point or line contact. A high friction is generated at these contact areas and when sound energy is transmitted attenuation is correspondingly high. Moreover the strap sections between such points of contact are kept short enough for the natural frequency of the assembly to remain sufficiently high so that it will not resonate readily. The resilient characteristic of the plugs improves the silencing effect. The strap mount 10 is held substantially immobile relative to the outer capsule and the entire assembly applies pressure outwardly on the capsule.

The springs 17 are disposed with the longitudinal axis thereof lying in planes which intersect internally of the strap support 10 substantially at a point corresponding to the center of gravity of the motor-compressor unit and the longitudinal axis of the shaft 20.

In the illustrated suspension four springs are used and are arranged in the "corners" of the polygonal strap support 10 adjacent the four vertical "edges" of the "cubic" shaped capsule. The springs are situated in the four corners of a rectangle being more or less represented by the strap. The longer sides of this rectangle run parallel with the axis of the compressor cylinder 21 while its shorter sides are perpendicular thereto. The springs are preferably coil springs having a progressive resistance and resiliency and are each capable of resilient movement in three dimensions with a progressive characteristic of resiliency, established in conjunction with the respective cups and sockets, in all directions.

The assembly is quite compact since the dimensions of the capsule 1, 2 need not be increased to accommodate the springs as is usually the case. The shortest dimension of the strap support is in the direction or sides perpendicular to the cylinder axis of the motor-compressor. The position of the springs along the diagonals of the polygonal strap 10 results in a very reliable suspension system with small deflections and in conjunction with the fact that the strap support 10 has longer sides parallel with the cylinder axis and its shorter sides perpendicular thereto further results in a space saving construction. The shortest dimension of the capsule perpendicular to the axis and the motor shaft axis is only determined by the dimension of the stator pack whose laminations, not shown, may be cut with a view to the most economic use of the iron sheets therein and by the clearance required for resilient suspension.

Those skilled in the art will recognize that there are no tolerance problems in the assembly of the compressor and mount. The strap support 10 under the influence of the springs 12 and as a result of its inherent resiliency and the plugs 14 offer sufficient compensation to equalize deviations in the inner cross section dimension of the capsule.

While a preferred embodiment of the invention has been shown and described it will be understood that many modifications and changes can be made within the true spirit and scope of the invention.

What we claim and desire to be secured by Letters Patent is:

1. In a hermetically sealed compressor for a refrigerant, a hermetic capsule, a motor-compressor unit for a refrigerant in said capsule, a resilient suspension system for said motor-compressor unit, a strap mount mounting said suspension system and said motor-compressor in said capsule free of said capsule, means holding said strap mount in position internally of said capsule, said strap mount comprising a resilient strap extending circumferentially of said motor-compressor unit, said suspension system comprising a plurality of springs resiliently suspending said motor-compressor unit from said strap mount, and said springs each having one outermost end thereof fixed to said strap mount substantially in a common plane.

2. In a hermetically sealed compressor for a refrigerant according to claim 1, in which said capsule comprises two parts joined along a plane at an angle with said common plane.

3. In a hermetically sealed compressor for a refrigerant according to claim 2, in which said plane along which said capsule two parts are joined extends diagonally of said capsule, said motor-compressor unit having a shaft vertically disposed in operation, and said strap mount being disposed substantially in a horizontal plane in operation.

4. In a hermetically sealed compressor for a refrigerant according to claim 1, in which said strap mount comprises means disposed making line and point contact with said capsule.

5. In a hermetically sealed compressor for a refrigerant according to claim 1, in which said means holding said strap mount in position comprises two guide bars holding said strap mount without being secured thereto, said guide bars having means mounting them on an inner surface of said capsule.

6. In a hermetically sealed compressor for a refrigerant according to claim 1, in which said strap mount has a polygonal cross section configuration and in which said suspension system springs, each have a longitudinal axis, the axes of said springs being disposed in planes intersecting within said strap.

7. In a hermetically sealed compressor for a refrigerant according to claim 6, in which said motor-compressor unit has a center of gravity, and in which said planes intersect at substantially said center of gravity.

8. In a hermetically sealed compressor for a refrigerant according to claim 6, in which said planes correspond with diagonals of said polygonal configuration of said strap mount.

9. In a hermetically sealed compressor for a refrigerant according to claim 6, in which said motor-compressor comprises a cylinder axis, and in which said polygonal configuration comprises a rectangle having its longer sides spaced from and parallel with said cylinder axis and having shorter sides spaced from and perpendicular to said cylinder axis.

10. In a hermetically sealed compressor for a refrigerant according to claim 6, in which said capsule has a cubic configuration and in which said springs are disposed adjacent four perpendicular edges of said cubic configuration.

References Cited

UNITED STATES PATENTS

| 2,473,904 | 6/1949 | Rataiczak | 230—58 |
| 2,500,751 | 3/1950 | Halfvarson | 230—235 X |

ROBERT M. WALKER, *Primary Examiner.*